United States Patent Office 3,523,620
Patented Aug. 11, 1970

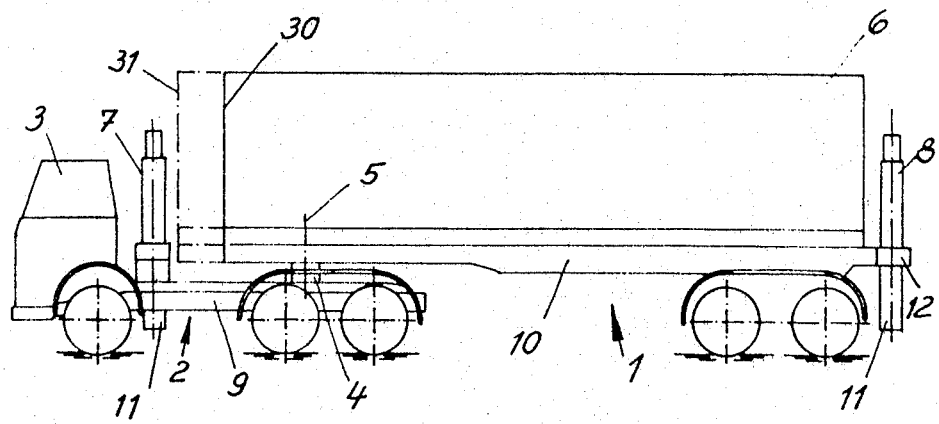
Fig. 1
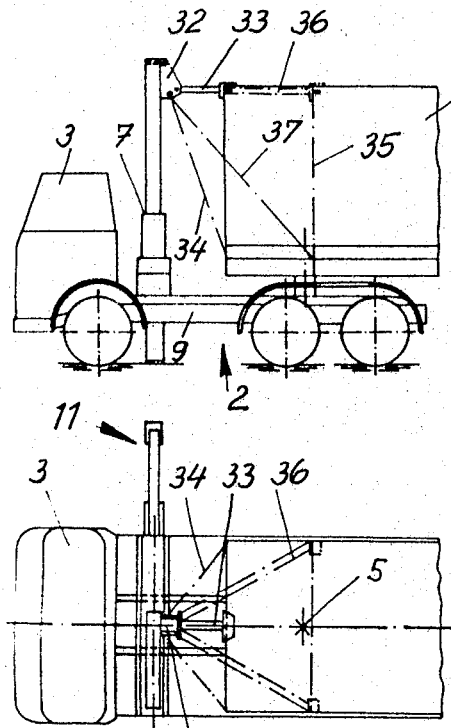
Fig. 2
Fig. 3
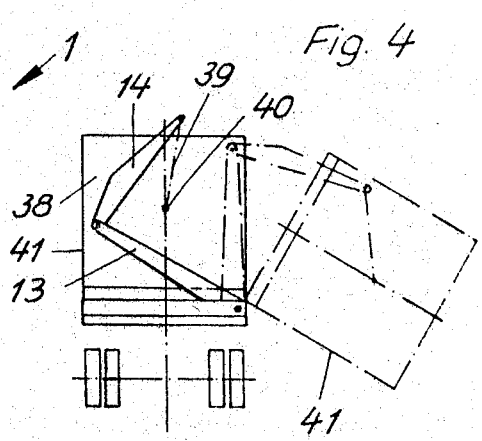
Fig. 4

3,523,620
TRANSPORT VEHICLE
Kaspar Klaus, 46 Schlachthofstrasse, 894
Memmingen, Germany
Continuation of application Ser. No. 656,593, July 27,
1967. This application June 26, 1969, Ser. No. 842,777
Claims priority, application Germany, Aug. 29, 1966,
1,288,454, 1,580,097
Int. Cl. B60p 1/48
U.S. Cl. 214—77                                     5 Claims

ABSTRACT OF THE DISCLOSURE

A road transport vehicle equipped with means for loading and unloading a load such as a container in which pivoting devices located in front of and behind the load on the vehicle are operated by piston-cylinder assemblies. Each device includes main and auxiliary rocker arms respectively connected for pivotal movement to the frame and main arm with the pivotal axes being parallel to the longitudinal axis of the vehicle. The load is adapted to be suspended at the free end of the auxiliary rocker arms, and a supporting foot operable via a piston-cylinder assembly is mounted on the frame in the range of each pivoting device so that the foot can be swung outwardly on the load side.

---

This application is a streamlined continuation of application Ser. No. 656,593, filed July 27, 1967.

The present invention relates to a transport vehicle provided with means for loading and unloading, respectively, a load, and more particularly a container.

It is the object of the invention to provide a transport vehicle with a device for loading and unloading, respectively, a load, by which it is possible to load and unload at any place the full load or at least an essential part thereof in one single operation.

The load may, on this occasion, rest on the ground, a loading platform or a railway truck and while the invention is particularly efficacious for the transport of containers, it is not thus limited.

It is a further object of the invention to design the loading and unloading device, respectively, in such a way that the stability of the vehicle during the loading process is guaranteed and this is particularly applicable to containers with a relatively high weight.

A further object of the invention is that the configuration of the loading and unloading device, respectively, is such that the loading surface at disposal on the vehicle is prejudiced as little as possible.

It is a further object of the invention to diminish as little as possible by the loading and unloading device, respectively, the carrying capacity of the vehicle.

The invention may be used for powered motor trucks, but it is also for use with semi-trailers and their tractors. By means of the invention, not only containers can be loaded and unloaded, respectively, in one single operation, but it is also possible to empty containers which are carried pivotally on the vehicle and this is true even if the containers have essentially vertical lateral walls.

The transport vehicle according to the invention provided with a device for loading and unloading, respectively, of a load, and more particularly a container, is characterized that on the frame of the vehicle in front of and behind the load a pivoting device is arranged which can be operated by cylinder and piston arrangements, which pivoting device includes a main rocker arm with an auxiliary rocker arm articulated thereto, that the pivoting axes of both rocker arms are directed parallel to the longitudinal axis of the vehicle and that the load is suspended at the free extremity of the auxiliary rocker arm and that within the range of each pivoting device a supporting foot is arranged which can be swung out on the load side and which is likewise operated by a cylinder-piston arrangement.

These and further features of the invention become clear from the following description of some diagrammatically shown embodiments of the invention by which the range of application of the invention shall not be limited.

Figure 5:
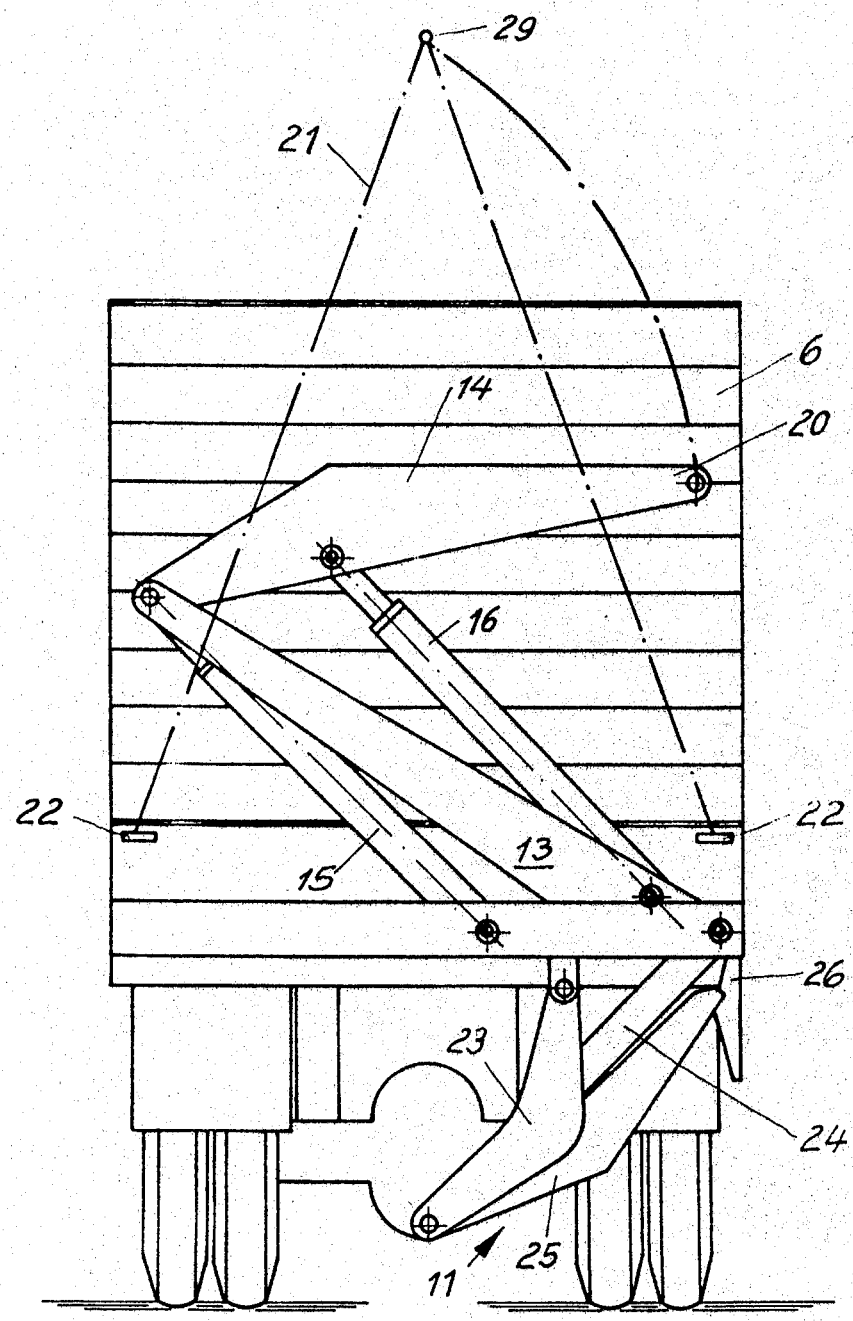
Figure 6:
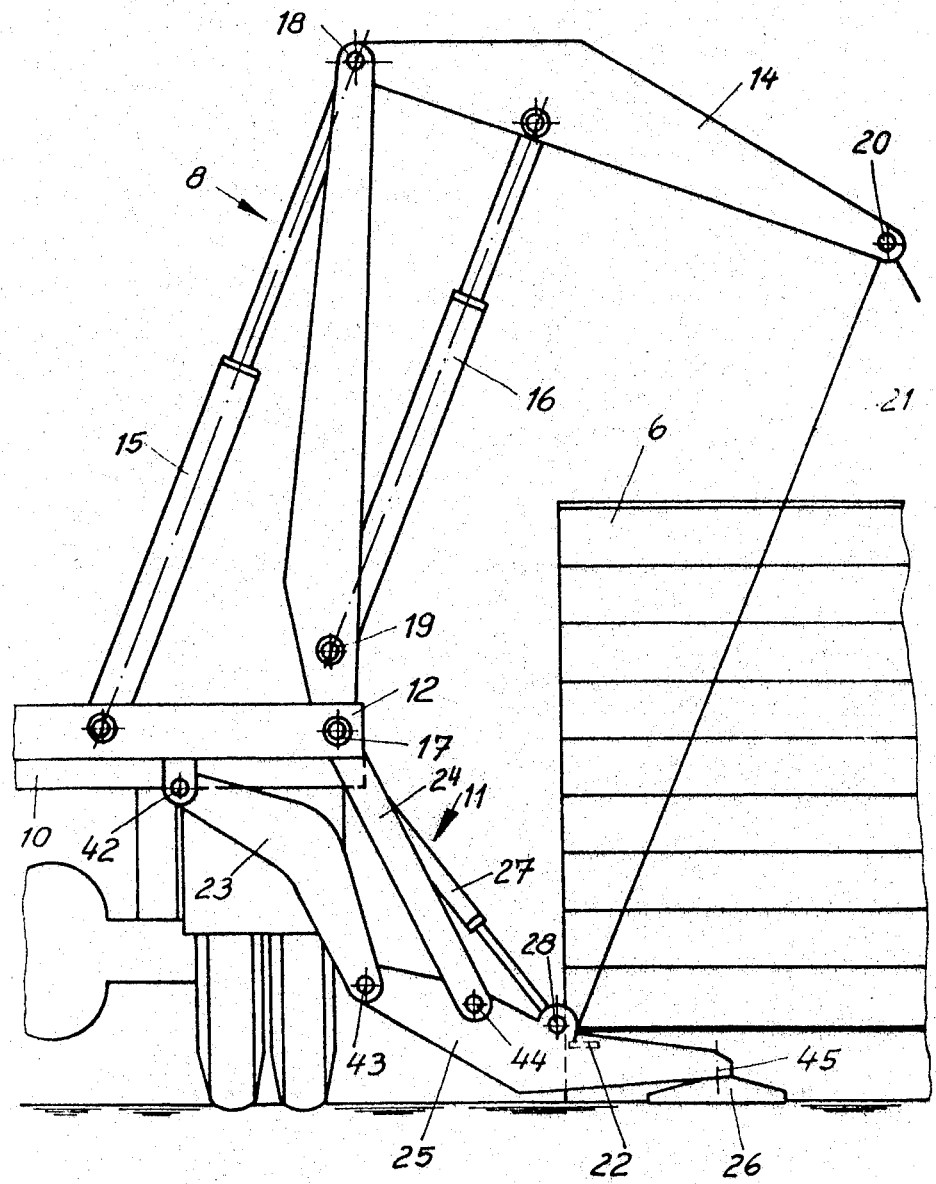

FIG. 1 is a lateral view of a transport vehicle according to the invention (semi-trailer with tractor) in the transport position, FIG. 2 is a fragmentary view of the vehicle shown in FIG. 1 in the charging, FIG. 3 is a plan view of FIG. 2, FIG. 4 is an end elevational view of a modified embodiment according to the invention, FIG. 5 is an enlarged end view of a transport vehicle in accordance with the invention in the transport position, and FIG. 6 is an end view of the embodiment according to FIG. 5 during the loading operation.

The semi-trailer road train according to FIG. 1 consists, as is known per se, of a semi-trailer 1 and a tractor 2. A driver's cab 3 is arranged on the tractor 2. The front end of the semi-trailer rests on the tractor 2 by means of a fifth wheel 4. The vertical pivot axle or king-pin of the fifth wheel 4 is designated 5. A container 6 is charged on the semi-trailer 1.

According to the invention, pivoting devices 7 and 8 are mounted in front of and behind the load, respectively i.e. in front of and behind the container 6. The front pivoting device 7 is mounted, in this situation, on a frame 9 of the tractor 2, while the rear pivoting device 8 is carried by a frame 10 of the semi-trailer. A swing-out supporting foot 11 is provided within the range of each pivoting device 7 and 8. In FIGS. 1 to 4, the configuration of the pivoting devices and the supporting feet are shown diagrammatically. The details of the pivoting devices and of the supporting feet are clearly shown in FIGS. 5 and 6.

FIGS. 5 and 6 illustrate that the swing-out supporting foot 11 and the pivoting device 8 are carried on a common supporting frame 12 connected with the frame 10. Also the pivoting device 7 is preferably arranged together with its cooperating supporting foot on a common supporting frame fastened on the frame 9 of the tractor. It is, however, possible to mount the supporting foot and the pivoting device directly on the semi-trailer frame.

Each pivoting device includes a main rocker arm 13 and an auxiliary rocker arm 14. The main rocker arm is moved by a cylinder-piston arrangement 15, while the auxiliary rocker arm is moved by a cylinder-piston arrangement 16. The pivoting axis of the main rocker arm is designated 17 and that of the auxiliary rocker arm 18. Both axes 17 and 18 are mounted in the longitudinal direction of the vehicle.

It is desirable that the cylinder-piston arrangement 15 engages the main rocker arm 13 within the range of the axis 18 since a bending load acting on the main rocker arm 13 is thereby avoided. Also the manner of supporting the cylinder piston arrangement 16 serves the same purpose. This support is provided near the axis 17 by a connection bolt 19.

The load, viz the container 6 is suspended at a free extremity 20 of the auxiliary rocker arm 14 by means of carrier ropes 21. The carrier ropes 21 are fastened in eyelets 22 or other suitable fastening means at the container 6.

The supporting foot 11 is shaped essentially as an articulated square and comprises a lever 23 with the articulations 42 and 43, a lever 24, and articulations 44 and 17. The levers 23 and 24 are connected with each other via a foot element 25 which carries at its extremity 45 a plate 26. The swing-out supporting foot 11 is moved by a cylinder-piston arrangement 27 located between bolts 28 at the foot element 25 and the common supporting frame 12. The axis 17 of the main rocker arm 13 may be used as an articulation point of the swing-out supporting foot 11. It is, however, also possible to provide different articulation bolts for the main rocker arm 13, the lever 24 and the cylinder piston arrangement 27.

It is clear that with the piston of the cylinder-piston arrangement 27 retracted, the supporting foot assumes the position shown in FIG. 5. If the piston is extended, the supporting foot will be in the position according to FIG. 6.

FIG. 5 shows the transport positions of the loading and unloading device, respectively. The carrier ropes 21 are removed in the transport position. At the beginning of the unloading operation, the free extremity 20 of the auxiliary rocker arm 14 is brought into position 29 by moving the cylinder-piston arrangement 16 and the carrier ropes 21 then connect the free extremity 20 with the eyelets 22. If the supporting foot is extended, the load can be displaced from the position in FIG. 5 into the position in FIG. 6 and the loading operation is effected in the reverse sequence.

It is clear that it is particularly favorable if the axis 17 of the main rocker arm 13 is as near as possible at the unloading side. The course of the forces of the load from the free extremity 20 to the auxiliary rocker 14 to the cylinder piston arrangement 16 and from there to the supporting foot 11 becomes then particularly favorable. It is clear from FIG. 1 that front end 30 of the container 6 is spaced from the pivoting device 7 and this spacing is necessary to prevent a collision between the front end of the semi-trailer 1 with the pivoting device if the vehicle is driven around curves or bends in the road. This spacing is, however, disadvantageous for the unloading operation, as in case of a mere connection of the free extremity 20 of the auxiliary rocker arm 14 with the load an oblique pull is exerted on the pivoting device 7 which additionally stresses this pivoting device. In order to prevent such an oblique pull, different possibilities are provided.

The pivoting device 7 may be arranged for longitudinal shifting movement on the frame 9, so that for the loading operation, the pivoting device 7 can be displaced towards the front end 30 of the container 6. It is also possible to shift the container 6 together with the semi-trailer 1 into the dash-and-dot position 31, e.g. by a slidable arrangement of the fifth wheel 4 such that the fifth wheel 4 can be shifted on the frame 9 or the frame 10.

A different solution to the problem is shown in FIGS. 2 and 3. In this embodiment, a suspension unit 32 is used on the extremity 20 of the pivoting device. The unit 32 is provided with a vertical carrier bar arrangement 33 for engaging the container 6, and carrier ropes 34 also engage the unit. If containers of different length are used, carrier bar arrangements and carrier ropes of different length are employed. In FIGS. 2 and 3, a shorter container 35 with its related vertical carrier bar arrangement 33 and carier ropes 37 are shown. If containers 6 of different length are used on the semi-trailer 1, a configuration of the frame 10 of the semi-trailer 1 is recommended which makes possible a modification of the length of the frame. A corresponding possibility to shift the rear pivoting device 8 as compared with the frame 10 is also desirable.

FIG. 4 illustrates a further possibility of application of this invention. The device provided with supporting feet and in which only the main rocker arm 13 and the auxiliary rocker arm 14 are shown, can also be used for tilting a dump container 38 which is carried in a tiltable manner on the vehicle frame in the range of the axis 17 of the main rocker arm 13. In this form, a carrier rope 39 connects the free extremity 20 of the auxiliary rocker arm with a point 40 on the container 38 which lies approximately in the central plane. It is also possible to tilt the container by 120° so that a container 38 loaded with bulk goods, i.e. garbage, can be unloaded if lateral walls 41 of the container 38 are flat.

The supporting feet 11 can be swung in the disclosed embodiments under the vehicle frames 9 or 10, respectively. It is, however, possible to pivot the supporting feet above the vehicle frame, particularly if the supporting feet are mounted within the range of the wheel axles of the vehicle.

I claim:

1. A tractor-trailer vehicle each having a chassis provided with a loading device for the lateral loading and unloading of a load and more particularly a container, said loading device comprising at least two pivoting units, one of said units being located before and the other unit behind the load, said one unit located on the tractor, said other unit located on the trailer, supporting frames provided on the chassis before and behind the load, each pivoting unit being pivoted to a supporting frame, the pivotal axis of each pivoting unit extending parallel to the longitudinal axis of the transport vehicle, at least one of said supporting frames being displaceable relative to its vehicle chassis in the longitudinal direction of the vehicle for adapting the distance between the supporting frames to the length of the load, said load being adapted to be suspended at the free end of each pivoting unit, a piston and cylinder assemblage operably related to each frame and pivoting unit for pivoting the pivoting unit, a supporting foot pivotably mounted to each frame on the loading side of the vehicle within the range of each pivoting unit capable of being swung outwardly from the loading side, said supporting foot being swung under the vehicle chassis in the driving condition of the vehicle, and a piston and cylinder assembly operably connected to each frame and each foot respectively for moving each foot about its pivotal mounting.

2. The tractor-trailer vehicle as claimed in claim 1 in which each pivoting unit includes a main rocker arm pivoted to a supporting frame and an auxiliary rocker arm pivoted to the main rocker arm, a piston and cylinder assemblage operably connected to each main rocker arm and each auxiliary rocker arm for pivoting the auxiliary rocker arm relative to the main rocker arm, and the pivotal axis of said last named piston and cylinder assemblage to the main rocker arm and the auxiliary rocker arm extending in parallelism to the longitudinal axis of the vehicle.

3. The tractor-trailer vehicle as claimed in claim 2 in which said supporting foot includes a lever pivotally connected at one end to the supporting frame, a foot element pivotally connected to the other end of the lever, a second lever pivotally connected at one end to the foot element and at its opposite end to the pivot of the main rocker arm to the supporting frame, and a cylinder-piston unit pivotally connected to the foot element and to the pivot of the main rocker arm to the supporting frame.

4. The tractor-trailer vehicle as claimed in claim 1 including means for varying the distance between said pivoting unit located on the tractor and the forward end of the load disposed on the trailer.

5. The tractor-trailer vehicle as claimed in claim 2 including suspension means provided on the free end of said auxiliary rocker arm defined by an essentially horizontal-vertical carrier bar and a carrier rope for the load.

References Cited

UNITED STATES PATENTS

| 2,971,661 | 2/1961 | Isaacs | 214—80 |
| 2,996,206 | 8/1961 | McKee | 214—38 X |
| 3,174,630 | 3/1965 | Tantlinger et al. | 214—77 X |
| 3,458,066 | 7/1969 | Klaus | 214—77 |

GERALD M. FORLENZA, Primary Examiner

R. J. SPAR, Assistant Examiner

U.S. Cl. X.R.

212—145